Patented July 15, 1952

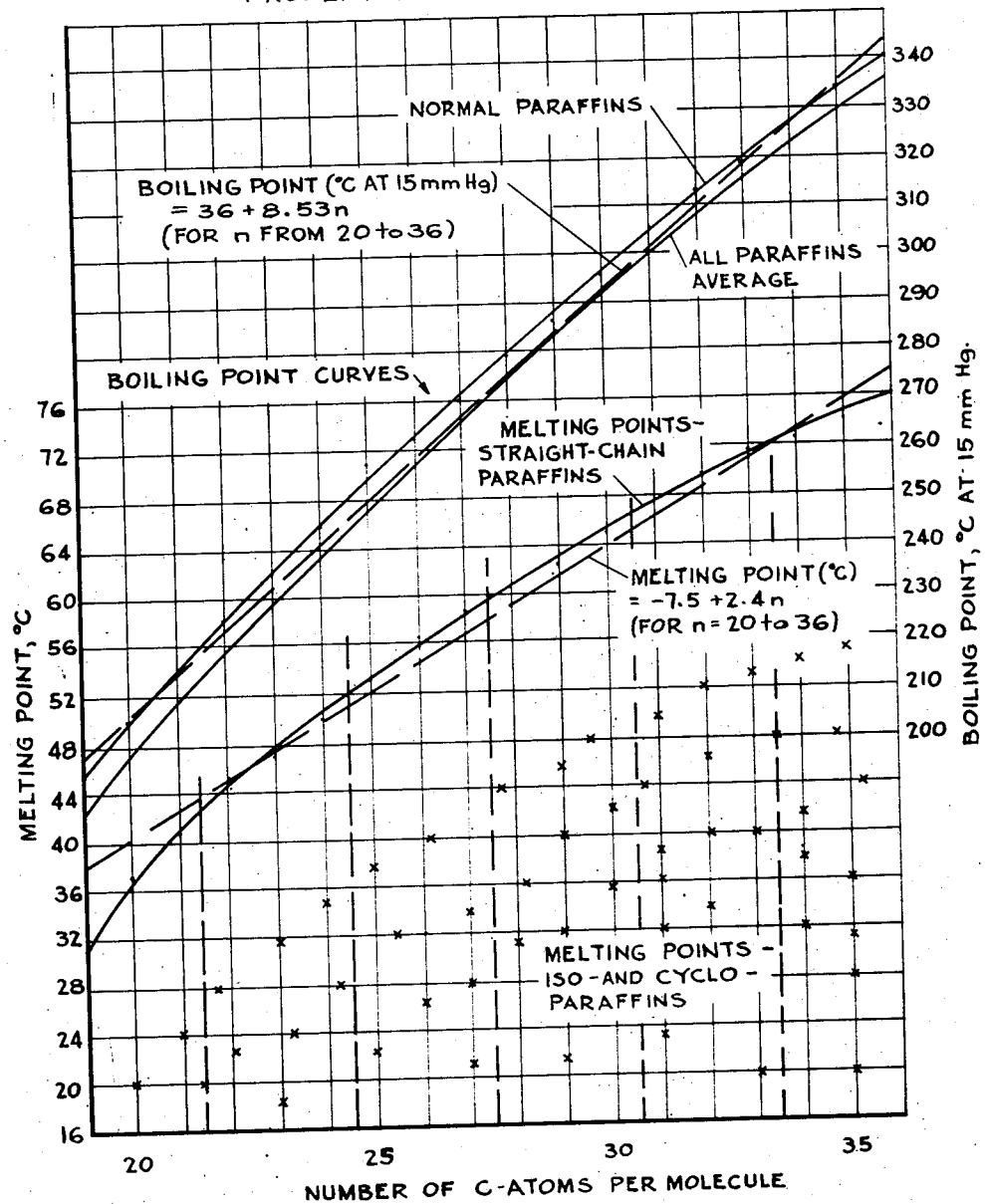
FIG. I

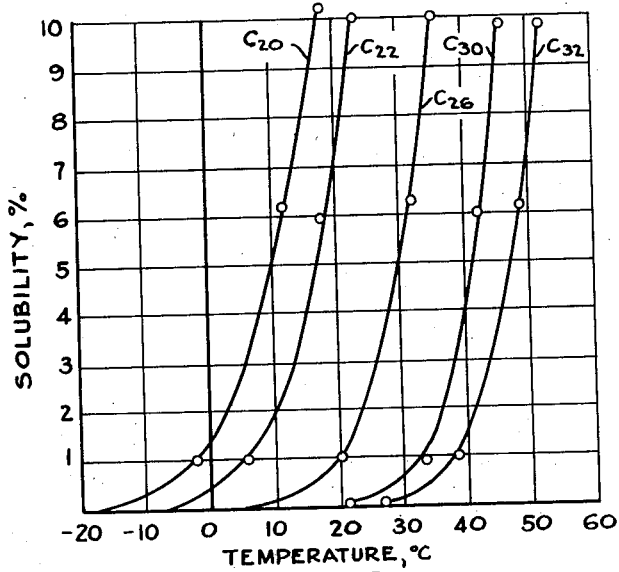
FIG. II
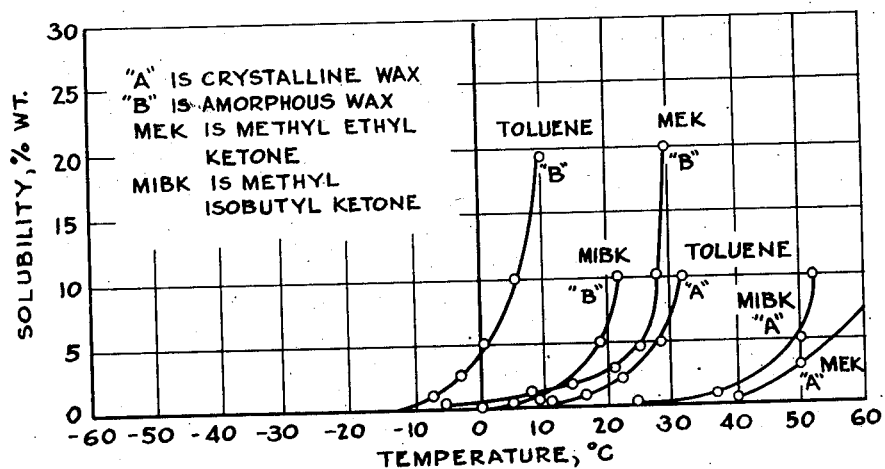
FIG. III

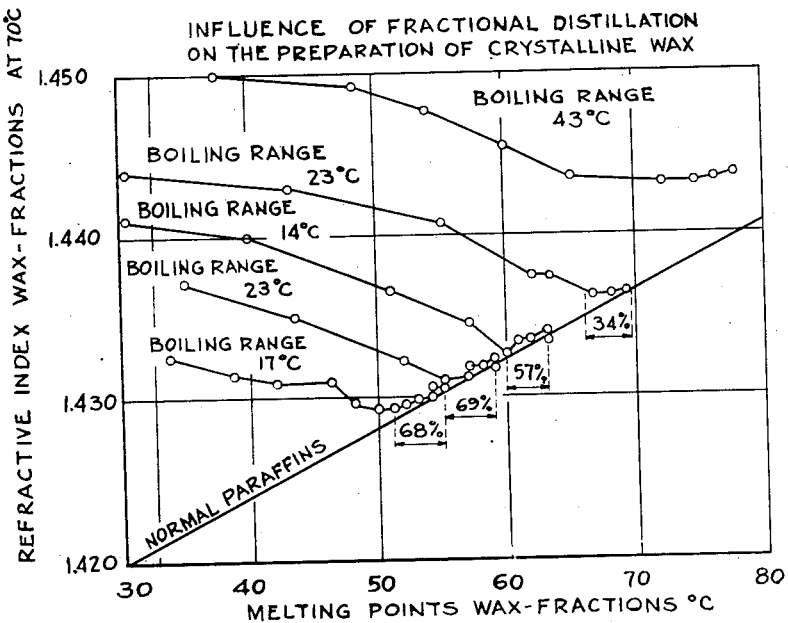
FIG. IV
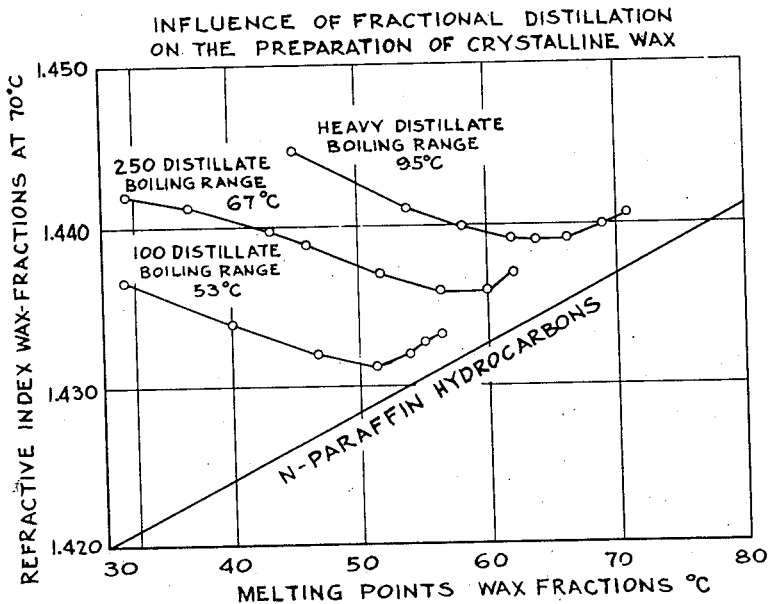
FIG V
INVENTOR:
AUGUST A. SCHAERER
BY: John H. Colvin
HIS AGENT

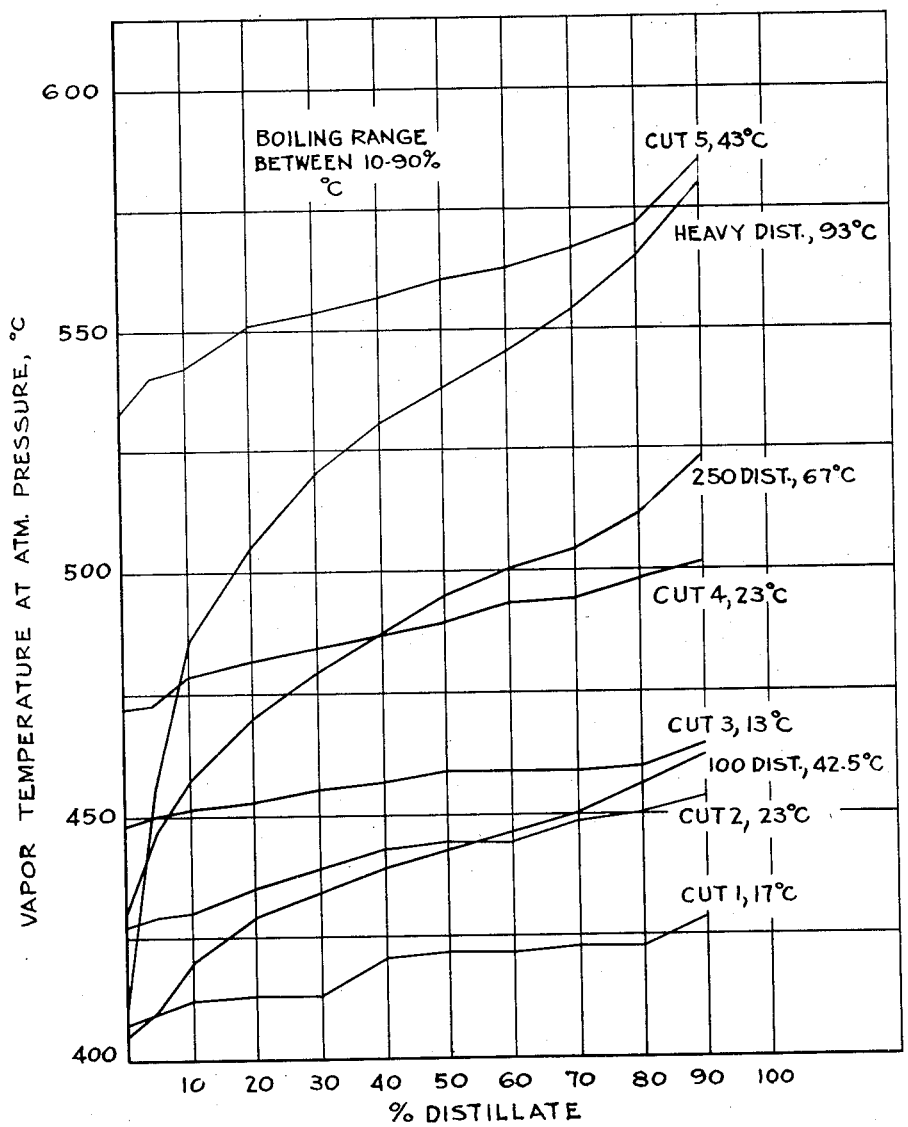

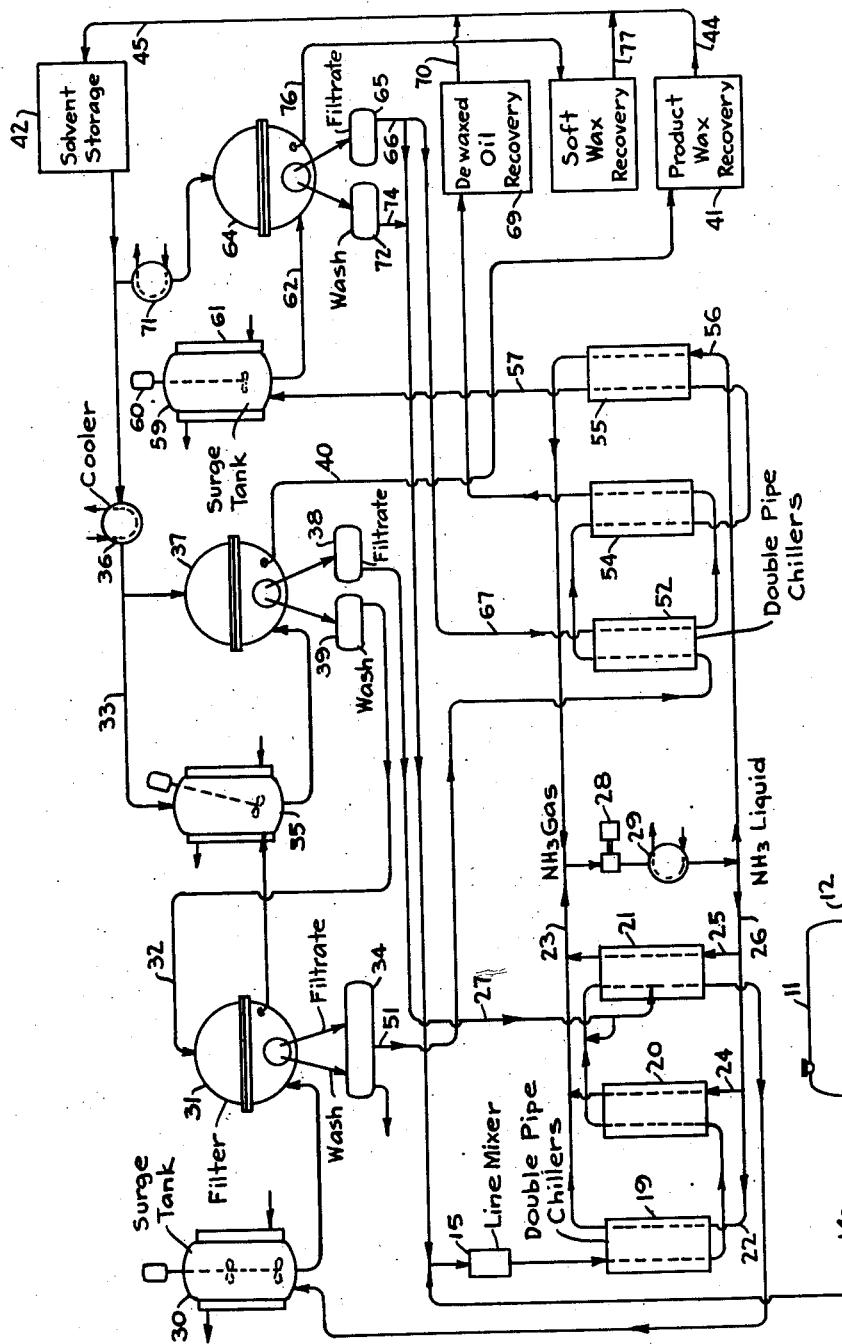

2,603,589

UNITED STATES PATENT OFFICE 2,603,589

PROCESS FOR SEPARATING HYDROCARBON WAXES

August A. Schaerer, Berkeley, Calif., assignor to Shell Development Company, San Francisco, Calif., a corporation of Delaware Application March 31, 1950, Serial No. 153,210

18 Claims. (Cl. 196—17)

This invention relates to the art of separating hydrocarbon waxes. More particularly it pertains to the separation and recovery of various types of hydrocarbon waxes from mixtures thereof. Still more specifically, it pertains to the separation from waxy mineral oil stocks, including such stocks as contain a predominant proportion of paraffin wax such as of the character of slack wax and the like, of normal or straight-chain paraffin waxes contained therein, separately and from non-straight chain or isomeric (iso- and cyclo-) paraffin waxes also contained therein.

Various methods have been used and suggested for the recovery and/or fractionation of paraffin waxes from mineral oil stocks. Thus, it is known to dewax waxy mineral oils or fractions thereof by cooling, sometimes after addition of a solvent and/or diluent. Dependent on the nature of the oil and the conditions of the operation, such as lowest cooling temperature, rate of cooling, manner of cooling, etc., the paraffin wax thus obtained has been either in the form of readily filterable crystals or of a poorly filterable, microcrystalline or amorphous product. The crystalline, readily filterable, products are usually obtained in connection with dewaxing operations as applied to paraffinic lubricating oil distillate stock and consist largely of high molecular weight aliphatic or paraffinic hydrocarbons with a straight chain, i. e. n-paraffins, whereas the microcrystalline or amorphous products consist, at least to a large and controlling extent, of high molecular weight aliphatic hydrocarbons of a branched character including branched-chain and ring-containing hydrocarbons, generally termed isoparaffins and cycloparaffins, respectively, both classes of which may be termed as isomeric paraffins (relative to the n-paraffins). Frequently occurring cycloparaffins in mineral oils are paraffins having a naphthenic ring, generally of five or six carbon atoms per ring, to which is bound a straight or branched aliphatic hydrocarbon chain. Waxes obtained by the usual dewaxing operations, with or without the aid of solvents and/or diluents, generally contain appreciable proportions of oil. These waxes are usually de-oiled by a so-called sweating and filtering process and/or a solvent de-oiling process.

The n-paraffin hydrocarbon waxes on the one hand and the non-straight-chain paraffin hydrocarbon waxes on the other hand have properties which in many respects are widely divergent. These differences in properties account, for example, for the differences in applications or utility of the n-paraffin waxes and the isomeric paraffin waxes. Thus, for instance, normal paraffin waxes having at least 22 carbon atoms per molecule are particularly suitable for the manufacture of candles (candle wax) and paraffin paper, while the isomeric (iso- and cyclo-) paraffin waxes, especially those having more than approximately 26 carbon atoms per molecule, in an oil-free state, form useful products on account of their plastic properties and adhesion to glass and to metal articles.

In view of the differences in properties between the straight chain or normal paraffin waxes on the one hand, and the isomeric paraffin waxes on the other hand, it is desirable and, therefore, an object of this invention to provide an improved process whereby they may be obtained from waxy petroleum stocks and separately from each other. A further object is to provide an improved process for the separation of n-paraffin waxes from iso- and/or cyclo-paraffin waxes and/or from oils in admixture therewith, and at the same time to separate the n-paraffin waxes into various fractions thereof approximating those of single molecular species. Another object of the invention is to provide an improved process for dewaxing waxy oils and separating and recovering the waxes as desirable fractions of n-paraffinic waxes and of isomeric paraffinic waxes. Still another object is to provide an improved process for de-oiling oily waxes and separating and recovering the waxes as desirable fractions of n-paraffinic hydrocarbon waxes and of iso- and/or cyclo-paraffinic hydrocarbon waxes.

The foregoing objects will be better understood and others will become apparent from the following description of the invention, which will be made with reference to the accompanying drawings, wherein:

Fig. I is a graphical representation of the relationships between the boiling points, the melting points and the number of carbon atoms per molecule of paraffin hydrocarbons containing from 20 to 35 carbon atoms per molecule;

Fig. II shows graphically the solubility-temperature relationships of various normal paraffin wax hydrocarbons in methyl isobutyl ketone;

Fig. III shows graphically the solubility-temperature relationships of a high melting crystalline wax and of an amorphous paraffin wax in various organic solvents;

Figs. IV and V are graphs showing the influence of fractional distillation on the separation by crystallization of the waxes in waxy petroleum distillates;

Fig. VI shows graphically the distillation characteristics of the various distillate fractions represented in Figs. IV and V; and Fig. VII is a diagrammatic flow sheet of a process for the fractionation of paraffin waxes in accordance with an embodiment of the invention.

It has now been found that normal (i. e., straight-chain) paraffin waxes may be separated from other (i. e., iso- and cyclo-) paraffin waxes in mixtures thereof by a combination of operations which comprises fractionating the given mixture into a number of fractions according to molecular weight or mass, at least one fraction of which has a relatively small range of carbon atoms per molecule (3 to 4), and contains both straight-chain paraffins and non-straight-chain paraffins within that carbon-atom-per-molecule range, and fractionating at least that fraction, under selected conditions according to freezing or melting point, as by fractional crystallization, to produce a first, higher melting point, fraction of wax composed substantially entirely of at least a substantial portion up to substantially all of the straight-chain paraffin hydrocarbons present in the narrow-carbon-atom-range fraction, and a second, lower melting point, fraction composed essentially of the non-straight-chain paraffin hydrocarbons. It is also contemplated to adjust the temperature of the second fraction, preferably in the presence of a solvent or diluent, to a point such that higher melting point non-straight-chain paraffin hydrocarbons present therein are precipitated from lower melting point, oily, non-straight-chain paraffins present. In accordance with a preferred embodiment of the invention, the waxy mixture is fractionated into a plurality of fractions having small carbon-atom-per-molecule ranges, respectively, and each fraction is then fractionated according to melting points of paraffin waxes present in the respective fractions, to produce from each fraction a first, higher melting point, fraction, composed substantially entirely of at least a substantial portion up to substantially all of the straight-chain paraffin hydrocarbons present in the particular fraction thus fractionated. Still further, the remaining portion of each fraction so fractionated may be fractionated separately at a still lower temperature to precipitate the higher melting point non-straight-chain paraffin hydrocarbons present therein from the lower melting point, oily, non-straight-chain paraffins present, or any two or more of the remaining portions may be combined into one or more composite fractions of non-straight-chain hydrocarbon and then fractionated at a suitable temperature to separate iso- and cyclo-paraffinic hydrocarbons having melting points above a selected melting point from oily hydrocarbons having melting points below that melting point.

The invention is applicable to the separation of normal paraffin waxes from iso- and cyclo-paraffin waxes from mixtures composed for the most part of such waxes. It is equally applicable to the separation of such waxes when they are present in oily wax mixtures thereof, such as oily waxes which have been separated from petroleum lubricating oil distillates by the usual lubricating oil dewaxing processes. The invention may also be used for the recovery and separation of normal paraffin waxes from iso- and cyclo-paraffin waxes, with or without subsequent separation and recovery of the iso- and cyclo-paraffin waxes, from highly paraffinic and paraffinic-naphthenic petroleum lubricating oil base stocks and distillates therefrom.

The present invention is based on the discovery that when a paraffinic petroleum waxy mixture of hydrocarbons is fractionated into narrow molecular weight range fractions, that is, into fractions in which the range of carbon atoms per molecule is small, such as 3 to 4, and preferably 2 or 3, which fractionation may be effected by making relatively sharp and narrow boiling range distillate fractions therefrom, since the boiling points of the normally solid paraffinic waxes are substantially the same for both normal and isomeric paraffinic waxes having the same number of carbon atoms per molecule, then the normal paraffin waxes present in each such fraction may be readily separated as substantially pure normal paraffin waxes from the remainder of the fraction by fractional crystallization of said fraction in a fluid state, either molten or dissolved in an organic solvent, since the melting points of the paraffinic waxes depend both on the molecular weight and on the molecular structure and the melting point of the lowest melting normal paraffin wax present in a given fraction is higher than the melting point of essentially all, if not all, of the isomeric paraffinic waxes present. The isomeric paraffin waxes remaining in the fractions may be separated from any oily paraffinic hydrocarbons therein, or the fractions separated into relatively higher melting point and relatively lower melting point non-straight-chain hydrocarbons by fractional precipitation at a suitable temperature, with or without added diluent or solvent.

The fractionation of the waxy mixture according to molecular size or weight is most advantageously and preferably effected by an efficient fractional distillation, preferably under reduced pressure, at least for the higher molecular weight hydrocarbons, which distillation is carried out in such a manner as to effect a relatively sharp separation between the hydrocarbons having different boiling temperatures. The fractionation of hydrocarbons by distillation according to molecular weights and carbon-atom-per-molecule-content will be understood more readily by reference to the graphical representations of the relationships between the boiling points and the carbon-atoms-per-molecule of various types of paraffin hydrocarbons, as shown in Fig. I. The upper curve (normal paraffins) in Fig. I was constructed from the boiling points of the normal paraffin hydrocarbons having from 19 to 36 carbon atoms per molecule. The next solid curve thereunder represents the boiling point-carbon atom per molecule relationship for all paraffinic hydrocarbons, the melting points being averaged for all paraffins having a given carbon-atom-per-molecule content. The boiling points represented on both these boiling point curves are at 15 mm. of mercury pressure. The numerical values for the boiling points of the paraffins and for the melting points of the straight-chain paraffins, from which the curves were constructed, were taken from "Physical Constants of the Principal Hydrocarbons," by M. P. Doss, 4th Edition, 1943, and "Physical Constants of Hydrocarbons," by G. Egloff, A. C. S. Monograph Series No. 78, vol. II, 1940. Conversions of boiling points from reported values to 15 mm. of Hg pressure, where the reported value was for a different pressure, were made by utilizing the conversion chart given by Watson and Wirth, in Ind. and Egn. Chem., Anal. Ed., vol. 7, page 73, January 1935.

The upper dashed line in Fig. I is a straight line with a slope of about 8.53° C. (at 15 mm. Hg) per unit carbon-atom-per-molecule change and, as is readily seen, represents within about 2° C. the boiling points of the normal paraffins from $C_{20}$ to $C_{36}$, and also represents within from about 2° C. to about 5° C. the boiling points of substantially all of the paraffinic hydrocarbons from $C_{20}$ to $C_{36}$. As indicated in Fig. I, this relationship is expressed by the equation:

Boiling point $$(°C. \text{ at } 15 \text{ mm. of Hg}) = 36 + 8.53n$$

for integral values of $n$ from about 20 to about 36, and wherein $n$ is the number of carbon atoms per molecule of the paraffinic hydrocarbon. According to the dashed line and the equation, there is a change in boiling points, of paraffinic hydrocarbons having from about 20 to about 36 carbon atoms per molecule, at 15 mm. of Hg pressure, of about 8.5° C. (15.3° F.) for each unit change in carbon atoms per molecule of the paraffin hydrocarbon. For other pressures the boiling temperatures are changed for the respective hydrocarbons, as may be readily determined by use of the already indicated conversion method of Watson and Wirth, although the change in boiling temperatures with change in carbon atom per molecule content at a given pressure remains substantially the same, namely about 8.5° C. per unit change in carbon atoms per molecule. Thus, the boiling temperature converted to 760 mm. of Hg (atmospheric pressure), of $n=C_{26}H_{54}$ is about 422° C. and of $n=C_{30}H_{62}$ is about 462° C., the difference being about 40° C. for the $C_{26}$ to $C_{30}$ range, a carbon atom range of four, or about 10° C. per carbon atom difference.

It will be seen from the foregoing, and by reference to Fig. I, that a sharply cut, narrow boiling range distillate fraction of paraffinic hydrocarbons having an average boiling point within the range of from about 200° C. to about 340° C., and having a boiling range of not over about 40° C., or about 75° F., at times 45° C., at 15 mm. of Hg, will define a mixture of paraffinic hydrocarbons containing as paraffinic hydrocarbons substantially only those which come within a carbon atom range of four. Thus, such a distillate fraction having a boiling range of from about 258° C. to about 300° C. (at 15 mm. of Hg) is restricted to paraffinic hydrocarbons which contain from 26 to 30 carbon atoms per molecule, a carbon atom range of four. For all practical purposes, when dealing with petroleum hydrocarbon mixtures the end temperatures of the various fractions may be considered to be the 10% and 90% over points, respectively, although for the wider boiling range fractions (four carbon atom range) it is preferable that the 40° C. (or about 75° F.) range be more nearly the 5% and 95% over points, respectively. From the foregoing, it will be understood, for example, that when it is desired to secure a distillate fraction of paraffinic hydrocarbons containing as the lowest molecular weight normal-paraffin, $n$-$C_{26}H_{54}$, in any substantial amount, the distillate fraction will have an initial boiling point of about or only a small amount below the boiling point of the $n$-$C_{26}$ paraffin, that is about 260° C., and the end boiling point will be higher than 260° C. by a value of about 8.5 multiplied by "$n$," $n$ being the carbon atom range of the desired fraction. Of course, if the range is to be two carbon atoms, then the temperature range may be and preferably is, a small amount greater than twice 8.5, such as about 2.2 to 2.5 times 8.5, or from 18.7 to about 21.2, or about 20° C. (about 35° F.), anyway a range somewhat less than the minimum 3 carbon atom range, say less than 42° F. or 23° C.; for a three carbon atom range, the temperature range is from about 3 to about 3.5 times 8.5, or from 25° to about 30° C. (from 45° F. to about 55° F.) intermediately about 28° C. (about 50° F.), anyway less than say 34° C.

In connection with the relationships which exist between boiling range, carbon atom content range and relative melting points of straight-chain and non-straight-chain paraffin waxes, in the practice of the invention, it has been found that with paraffin wax mixtures as normally found in petroleum, at higher molecular weights the fractions tend to possess increased concentrations of isoparaffins so that melting point differences between the constituents become somewhat less, thus making it necessary to work with ever-decreasing sizes of fractions to obtain maximum yields and maximum purities of end product waxes. Thus, for those hydrocarbon fractions which possess an average molecular weight of from about 400 to about 520, the boiling point range spread (10-90% distilled) should be no greater than about 75° F. (about 40-45° C.), and preferably no greater than about 65° F. (35° C.) while, with an average molecular weight of more than 520 and up to, for example, about 800, and containing up to about 60 carbon atoms per molecule, the spread should be not over about 40-50° F. (about 22-28° C.), and preferably about 20° F. to 25° F. (about 11° C. to 15° C.) for 10% to 90% distilled, at 7 mm. of Hg, and essentially the same at 15 mm. and 50 mm. of Hg, respectively.

The fractionation of the narrow boiling range paraffinic waxy petroleum fractions into wax products according to melting points to separate substantially pure normal paraffin waxes from the non-straight-chain paraffinic hydrocarbons, and the coordinated combination thereof with the fractionation according to molecular weights or carbon content, will be more fully understood from the following description made with particular reference to the melting point relationships shown in Fig. I. The melting points of paraffin hydrocarbons are strongly dependent on the structures of the hydrocarbons. This appears to be true particularly in the case of structurally different paraffin wax hydrocarbons, that is paraffinic hydrocarbons containing about 16 or more carbon atoms per molecule, and especially those containing at least about 20 carbon atoms per molecule. Thus, either branching or ring-closure within an aliphatic (paraffin) hydrocarbon of the ranges indicated is accompanied by a marked and significant drop in the melting point. It has been found that this difference is sufficiently large such that the melting point of a given n-paraffin wax hydrocarbon containing $n$ carbon atoms per molecule ($n$ being at least about 16 and preferably 20 or more) is still significantly higher than the melting points of the iso- and cyclo-paraffin wax hydrocarbons which contain $n+3$, and even $n+4$, carbon atoms per molecule, the difference being much more marked for $n+2$. This is more readily seen from the portion of Fig. I which shows the relationships between the melting points (as ordinates reading on the left side of the figure) and the number of carbon atoms per molecule (along the horizontal axis). The melting points for the straight-chain paraffin hydrocarbons are represented by the indicated solid curve, which is approximated by the indicated straight dashed line, corresponding to the linear equation:

$$\text{Melting point (°C.)} = -7.5 + 2.4n$$

for integral values of $n$ from about 20 to about 36, and wherein $n$ is the number of carbon atoms per molecule of the straight-chain paraffinic hydrocarbon. Thus there is a change of about 2.4° C. in melting point for a change of one carbon atom per molecule.

Whereas there is only a single normal paraffin hydrocarbon having the formula $C_nH_{2n+2}$ for a given value of $n$, there are many isomeric branched-chain and cyclo-paraffinic hydrocarbons having the same number of carbon atoms per molecule. The "x" points in Fig. I are indicative of the melting points of such isomeric paraffins, the melting points of still many others of said isomers being below 16° C., the lowest point representable on the graph. In general, the melting point of the highest melting isomeric paraffin is considerably lower than the melting point of the corresponding normal paraffin wax, generally being at least about 10–15° C. In the case of actual natural mixtures the practical value may be at least about 20° C., or about twice as far below the melting point of said corresponding normal paraffin wax as the melting point of the normal paraffin wax which contains as much as four carbon atoms per molecule less than said corresponding normal paraffin wax.

In the graph in Fig. I, various fractions are defined by vertical dotted lines. Each of the fractions so defined covers approximately a region ranging from $n$ to $n+2$, inclusive, carbon atoms, i. e., a range of two carbon atoms, "range" being defined as the difference between the smallest and largest values of the variable (number of carbon atoms). Referring to the graph, it is seen, for example, that the n-paraffin hydrocarbon containing 25 carbon atoms per molecule has a melting point which is significantly higher than the melting point of the highest melting point non-straight chain paraffin hydrocarbon isomer (i. e., iso- or cyclo-paraffin hydrocarbon) which contains 28, or even 29, carbon atoms. It will be noted further from the graph that there are many more isomeric iso- and cyclo-paraffins containing 25, 26, 27, 28 and even 29 carbon atoms per molecule, which have melting points still further below the melting point of the 25-carbon atom normal paraffin hydrocarbon. These other isomeric paraffins constitute a large proportion of the total isomeric paraffin content of any actual petroleum distillate fraction of a petroleum oil stock containing both normal and isomeric paraffinic hydrocarbons.

Although the above-indicated differences in melting points of paraffin wax hydrocarbons having boiling points within a relatively narrow boiling range corresponding to a carbon content range of not more than about four (4) carbon atoms per molecule make it possible to separate such mixtures of paraffin wax hydrocarbons by a process of solidification and/or melting, based solely upon melting and solidification temperature differences, it is preferred to effect such fractionation in the presence of a suitable solvent or diluent. The solubility of a paraffin wax hydrocarbon in a solvent, for example, a polar solvent, such as oxygenated and/or halogenated hydrocarbon derivatives (methyl ethyl ketone, methyl isobutyl ketone, ethylene dichloride), and mixtures thereof, and also in admixture with hydrocarbons such as benzene, toluene, light petroleum hydrocarbons, and the like, is related to the melting point of the paraffin hydrocarbon in the sense that the solubility becomes exceedingly low at a given temperature below the solidification or melting point of the paraffin hydrocarbon, the given temperature being dependent upon and correlated with the melting point of the paraffin hydrocarbon and being substantially independent of the structural configuration of the paraffin. Usually those solvents which show any selectivity exhibit greater solvent power for the iso- and cyclo-paraffinic hydrocarbons than for the normal paraffins; hence enhancing their utility in the present invention.

Thus, an advantage which usually accrues from the use of organic diluents or solvents which possess more or less of solvent selectivity for the different types of paraffin hydrocarbons is that the difference (spread) between the solidification temperatures (in the presence of the solvent) of the lowest melting normal paraffinic wax and the highest melting isomeric paraffinic wax in the mixture is increased. This increased difference between solidification temperatures reduces the criticality of the temperature required for the desired separation of n- from isomeric-paraffin waxes in the mixture. However, regardless of whether there is any further spreading of the solidification temperatures in the presence of a solvent, the respective solidification temperatures of the different waxes are lowered below their melting points, because of the solvency of the solvent. This lowering is as much or more for the isomeric paraffins as for the normal paraffins. In general, in practical operations, wherein 2 to 10, and preferably 5 to 7, volumes of solvent are employed per weight of oil and/or wax, using consistent units in the c. g. s. system, as cubic centimeters of liquid per gram of solid, a temperature of 30° to 40° C. below the melting point of a given paraffin wax molecular species insures almost complete insolubility of that given wax.

In order to show how well a wax mixture may be separated by fractional crystallization, a blend of equal parts of three practically pure normal paraffin hydrocarbons was fractionally crystallized from methyl isobutyl ketone. The hydrocarbons used were:

(1) normal $C_{22}H_{46}$—M. P.=45° C.
(2) normal $C_{26}H_{54}$—M. P.=56° C.
(3) normal $C_{30}H_{62}$—M. P.=65.2° C.

their individual solubility curves in methyl isobutyl ketone are shown in Fig. II. One part by weight of this blend was dissolved in 9 parts by weight of methyl isobutyl ketone and then very slowly cooled. The first wax crystals appeared at 39° C., which is exactly the temperature at which the pure $C_{30}H_{62}$ would start to crystallize if it were alone in solution (as a 3.3% solution). With stirring, the wax slurry was cooled to 28° C. and then quickly filtered through a precooled Buchner funnel. (28° C. is approximately the temperature at which the $C_{26}H_{54}$ wax would start to crystallize if it were alone in the solution.) The wax cake was washed on the funnel with 3.3 parts (precooled) methyl isobutyl ketone, firmly pressed, and finally freed from solvent in a porcelain dish. After that the filtrate was further cooled to 15° C. (the saturation temperature of $n=C_{22}H_{46}$), filtered and again washed with 3.3 parts of solvent. After removing the solvent from both the cakes and the final filtrate, the following waxes were obtained:

|  | Filter Temp. ° C. | Wax, pts. | Wax, m. p., ° C. |
| --- | --- | --- | --- |
| Fraction 1 | 28 | 0.32 | 64.4 |
| Fraction 2 | 15 | 0.30 | 56 |
| Fraction 3 | Filtrate | 0.38 | 45.8 |

The effect of the presence of representative organic solvents on the solidification temperatures of representative straight-chain paraffin waxes and non-straight-chain paraffin waxes is shown in Fig. III. Referring to Fig. III, the solubilities of such paraffin waxes in methyl ethyl ketone, in methyl isobutyl ketone and in toluene at various temperatures are shown by the indicated curves. The two waxes referred to therein were obtained from a higher boiling distillate fraction of a Mid-Continent lubricating oil stock and they had melting points and average molecular weights as follows: (1) Crystalline wax—M. P.=65° C. and mol. wt.=430; and (2) amorphous wax—M. P.=35° C. and mol. wt.=485.

The practice and advantages of the invention will be more readily understood and appreciated from the following detailed description of the processing of a paraffinic/naphthenic petroleum lubricating oil base stock in accordance with the method of the invention, made with reference to Fig. IV, and of the processing of the same oil base stock in accordance with commercial practice, made with reference to Fig. V. Fig. IV represents graphically the results of the fractional crystallization of the various slack wax products obtained from various waxy distillate fractions of West Texas Ellenberger lubricating oil base stock, the distillate fractions having the boiling ranges as indicated on the respective curves. A West Texas Ellenberger lubricating oil crude stock was topped to remove the lighter, non-lubricating oil fractions, and then five consecutive vacuum distillate fractions of lubricating oil were obtained by careful fractionation in a fractionating column having the equivalent of four theoretical plates, the five fractions having 10–90% boiling ranges of 17° C., 23° C., 13° C., 23° C., and 43° C., respectively. The various distillate cuts were then individually dewaxed completely at about −25° C., with methyl ethyl ketone or methyl isobutyl ketone in the usual way. It will be understood that the distillate cuts could have been solvent extracted with a selective solvent such as phenol or furfural prior to the dewaxing operation, without materially affecting the subsequent separation of the normal paraffin waxes from the non-straight-chain paraffin waxes. Then each wax portion (containing the total wax present in a given distillate fraction) was separated by fractional crystallization as follows: The wax was dissolved in methyl isobutyl ketone (10 parts per part of wax portion) and slowly cooled until about 10% of the wax had crystallized. The crystals were filtered off, dried and weighed and the melting point and the refractive index at 70° C. were determined. The filtrate was further cooled and filtered in approximately 10% wax cuts. By plotting the refractive index against the melting point of each wax cut, straight-chain waxes can be distinguished from non-straight chain wax components and the yield of both wax types can be established. The melting points and refractive indices of the various fractions of wax thus separated are indicated in Fig. IV. It will be noted that there is a linear relationship between the refractive indices and melting points of the normal or straight-chain paraffin waxes. This relationship may be represented by the equation:

Index of refraction (at 70° C.) $=1.4074+0.0004\times$ M. P. in °C.

Pertinent corresponding data are tabulated below. It is readily seen from Fig. IV that such a fractional crystallization on a test portion of a narrow boiling range fraction being processed commercially at once gives information as to the temperature at which the separation of the normal paraffin waxes from the other waxes should be carried out to obtain the desired separation; it is the temperature at which an equilibrium increment of wax separated thereat has the lowest index of refraction of any equilibrium increment separated at any other temperature.

*Wax fractionation of West Texas Ellenberger distillates*

| | Properties of Fraction | | Total Wax in Fractions | | | Crystalline Wax | | | |
|---|---|---|---|---|---|---|---|---|---|
| Fraction No. | Boiling Range 10–90 Per Cent | Per Cent on Total Dist. | Per Cent Wax in Fraction | M. P. Wax °C. | R. I. 70° C. Wax | Per Cent Cryst. Wax | M. P. Wax °C. | R. I. 70° C. Wax | Mol. Wt. Cryst. Wax |
| | °C. | | | | | | | | |
| 1 | 17 | 20.4 | 6.65 | 51.5 | 1.4306 | 68.2 | 53 | 1.4308 | 355 |
| 2 | 23 | 19.5 | 7.22 | 54 | 1.4332 | 68.5 | 58 | 1.4326 | 380 |
| 3 | 14 | 19.8 | 7.15 | 56 | 1.4364 | 57 | 62.5 | 1.4347 | 420 |
| 4 | 23 | 20.0 | 7.45 | 58 | 1.4409 | 34 | 68.5 | 1.4367 | 450 |
| 5 | 43 | 20.3 | 4.95 | 65 | 1.4457 | 14 | 73 | 1.4438 | ca. 500 |
| Total | | 100 | 6.67 | | | 52 | | | |

As a comparison with the separations as shown in Fig. IV and described above, another portion of the same West Texas Ellenberger topped crude was distilled under reduced pressure and three separate lubricating oil stock distillate fractions were obtained, as indicated on the curves in Fig. V, namely, a first fraction having an average viscosity of 100 Saybolt Universal seconds at 100° F. and having a boiling range of about 53° C., a second fraction having an average viscosity of 250 SUS at 100° F. and having a boiling range of about 67° C., and a third heavy distillate fraction comprising the remainder of the stock which is distillable under normal plant vacuum distillation conditions without raising the temperature to cracking conditions, said fraction having a boiling range of about 95° C. Each fraction was solvent extracted and the respective de-oiled waxes were separately fractionally crystallized from solution in methyl isobutyl ketone, all of the operations being as nearly as possible like the corresponding operations already described with respect to Fig. IV. The marked differences in the resulting separations of the two series of operations are readily apparent from a comparison of Figs. IV and V. It will be seen that in the second case, not any of the first-separated, that is higher melting point, fractions of waxes were pure normal paraffinic hydrocarbons. For sake of completeness and clarification of differences, the boiling curves of the distillate fractions indicated in Figs. IV and V are given in Fig. VI.

Similar separations of the hydrocarbon waxes are obtained when other portions of the same lubricating oil distillate fractions are similarly fractionated, without prior separation of the oil components from the wax components and even without prior solvent extraction, although it is preferred to solvent extract the oil fraction prior to the separation of the waxes since the solvent extractable materials are more easily removed at this stage of the operation and it is easier thereby to produce waxes of better color and odor.

Having described the invention in a general manner and having discussed various factors related to the invention, and their correlation in the application of the invention, it will be better understood from a more detailed description of a more specific embodiment thereof. A more detailed description will be made with reference, for example, to a so-called "slack" wax or "crude" wax, produced and obtained in the art and which is usually an oil mass of a mixture predominating in paraffin waxes, including both n-paraffins and iso- and cyclo-paraffins, the proportions thereof depending on the nature of the petroleum stock from which the slack wax is obtained. A representative total lubricating oil distillate slack wax may have a boiling range of from about 180° F. to about 310° F. at 7 mm. of Hg. pressure, corresponding to from about 200° F. to about 330° F. at 15 mm. of Hg. pressure, and may have a range for the number of carbon atoms per molecule of $C_{20}$ to $C_{35}$ or $C_{36}$ and generally will contain from about 40% to about 80% of wax and 20% to 60% of oil, the melting point of the wax ranging from about 90° F. to about 165° F., depending on the relative proportions of wax and oil and also on the relative proportions of the various molecular species of wax molecules present.

Now, the first essential step, in accordance with the present invention, is to fractionate the slack wax into a number of fractions, at least one fraction of which, and preferably all of the fractions, contains paraffin hydrocarbon waxes which have a range of carbon atoms per molecule of not more than four and preferably not much than two and three, such that the melting point of the highest melting isomeric paraffin wax in said fraction is lower than the melting point of the lowest melting normal paraffin wax therein. In general, it will be satisfactory if at least 90% of the isomeric paraffin waxes therein melts below the melting point of the lowest melting n-paraffin wax present therein. The separation of the wax content of the slack wax into the indicated fractions may be effected either with or without a prior separation of any or a substantial proportion of the oil content thereof. That is, the slack wax may be de-oiled by any suitable method, such as sweating and/or solvent de-oiling, first to remove substantially all or a substantial proportion of the oil content thereof, to produce a scale wax and the separated wax then fractionated, as by distillation, into the desired fractions. Alternatively, the slack wax may be fractionated into the desired fractions, with subsequent removal of the oil contents thereof, if desired. It is not necessary, nor even desirable in many cases, to remove the oil content, its separation and/or recovery being better effected in subsequent operations. It will also be understood from the previous description with reference to Fig. II, that the total lubricating oil distillate stock may be fractionated into the narrow boiling range fractions and that each such fraction may be processed according to the invention to separate the straight-chain paraffin waxes therein from the other waxes, which other waxes may also be recovered separately.

Now, assuming for clarity of discussion that the slack wax has been fractionated to produce at least one narrow cut slack wax fraction as defined above, the next essential step of the process is the adjustment of the temperature of said fraction so as to insure the existence of the normal paraffin waxes therein in a solidified state and the existence of the isomeric iso- and/or cyclo-paraffin waxes in a liquefied state, or at least predominant proportions thereof, respectively, in the respective states. The desired separation, as supplied to the indicated fraction, can now be effected by adjusting the temperature of separation so as to be between the solidification temperature of the lowest melting normal paraffin wax hydrocarbon present and the the solidification temperature of the highest melting isomeric paraffin hydrocarbon present, which temperature of separation may be the same as or different from a temperature intermediate the melting points, as already indicated for those cases when a solvent is present, then maintaining the selected temperature until the desired liquefaction and/or solidification has taken place (that is, until an equilibrium has been reached), and separating the solid and lique phases. When the selected fraction of slack wax contains an appreciable proportion of oil, the presence of this oil will facilitate the separation of solid and liquid phases. The filtration may be further facilitated by the presence of fluid diluent and/or solvent which may be incorporated with the mixture either before or after adjustment of the temperature as indicated with the formation of the two phases. As suitable diluents one may use lighter petroleum hydrocarbon fractions, such as kerosene, gasoline, naphtha, propane, butane, etc., fractions, as well as various organic liquids such as halogenated hydrocarbons (chloroform, carbon tetrachloride, ethylene dichloride, ethylidene dichloride, etc.), ethers (ethyl ether, ethyl propyl ether, methyl isobutyl ether, and the like), ketones (acetone, methyl ethyl ketone, methyl isobutyl ketone, etc.), aromatic hydrocarbons (benzene, toluene, xylene, and the like), and various mixtures thereof.

Thus, having adjusted the temperature of the selected narrow cut slack wax fraction, with or without the addition of a suitable solvent, but preferably with the addition of a solvent such as a polar organic solvent or solvent mixture, with the resultant solidification of the normal paraffin waxes therein and/or the liquefaction of the isomeric paraffin waxes therein, the resulting mixture or slurry is separated, as by filtration or centrifugation or the like into a separated solid phase containing the normal paraffin waxes therein and a separated liquid phase containing the isomeric paraffin waxes together with the solvent and/or oil. In the case where hydrocarbon oil is present in the separated liquid phase, this phase is preferably cooled to a still lower temperature to solidify or precipitate the isomeric paraffin waxes, which resulting microcrystalline or amorphous wax is then separated from the oil and solvent.

In the absence of added solvent, the heavier substantially oil-free wax fractions require higher temperatures at which the separation of normal from isomeric paraffin waxes is effected; however, in the presence of a selective solvent not so high temperatures are required to effect the desired separation based on the precipitation of the normal paraffin waxes from the mixture while maintaining the isomeric paraffin waxes in the liquid state.

It will be understood, particularly by reference to Fig. I, that a substantial separation, which may be entirely satisfactory in some cases, depending on the initial wax material, the desired wax products, etc., may be accomplished by minor deviations from the above indicated combination of operations. Thus, for example, in the case wherein the selected narrow cut of wax fraction contains, say $C_{25}$ through $C_{28}$ paraffin hydrocarbons, and in which, for example, the straight-chain hydrocarbons are about 90% $C_{26}$, $C_{27}$ and $C_{28}$, a satisfactory yield of the straight-chain paraffin wax will be obtained even when the separation is effected at a temperature at which the lowest melting straight-chain wax ($C_{25}$) will exist as a liquid phase; at the same time the isomeric paraffin wax product, containing the 10% $C_{25}$ straight-chain wax, recoverable from the liquid phase, will be satisfactory for most purposes, particularly when the normal paraffin wax content thereof constitutes no more than about 10–20% of said isomeric paraffin wax product. Conversely, in some cases the composition of a given fraction may be such that the temperature of separation of the straight-chain and non-straight-chain paraffin waxes may actually be below the temperature at which the highest melting non-straight-chain paraffin wax present therein solidifies under the conditions of the operation and still satisfactory products will be obtained. Similarly, as will be seen from Fig. I, a slightly wider range fractions may be resolved into satisfactory straight-chain and non-straight chain paraffin wax products by application of the invention, even in those cases where the melting point of the lowest melting normal wax is not necessarily above the melting point of the highest melting isomeric-wax therein, provided the resulting "overlapping" of melting points does not involve more than about ten percent, preferably not more than five percent, of the total paraffin wax content of the fraction involved, or not more than about ten percent based on the normal paraffin wax content thereof. Thus, in general, the selection of a range of the paraffin wax hydrocarbons for a given fraction and/or the selection of a suitable temperature for separation of the normal- from the isomeric-paraffin waxes therein are correlated so that the paraffin wax content of one of the separated products will be such that the ratio of the weight of one of the types of paraffin waxes therein to the other type will be at least about 90 to 10, that is, 90% purity on the wax basis with respect to either the normal- or the isomeric-paraffin wax.

The following description of a preferred embodiment of the invention, made with reference to Fig. VII of the accompanying drawing which forms a part of the specification, will give a better understanding of the practice of the invention and will indicate the correlations between the various operations of the process. Referring to Fig. VII, it is seen that by the designated combination of operations, a narrow cut (narrow boiling range) slack wax (which was obtained as a narrow boiling range cut from distillation of a wide boiling range East Texas 250 neutral slack wax material having a melting range of 130–135° F. and containing about 10% of oil) is separated by a combination of crystallization and separation operations at 50° F. and —15° F. into a normal paraffin wax product, an isomeric paraffin wax product and a dewaxed oil product. More specifically, a narrow boiling range cut of slack wax with a melting point of about 130° F. and an oil content of about 15%, taken from a storage tank 11, provided with a suitable heating means as 12, at a temperature slightly above the melting point thereof, is transferred through a line 14 to a mixer 15 wherein it is mixed with about 1.5 parts by weight (all relative parts are based on a unit part by weight of charged slack wax) of a 70:30 by volume solvent mixture of methyl ethyl ketone and benzene introduced into the line 14 through a solvent line 16. The resulting mixture of slack wax and solvent is then transferred through a line 17 to a series of double pipe chillers 19, 20 and 21, through which the mixture passes out of contact with, but in heat interchange relation to, a cooling means, which in this case is refrigerating ammonia delivered thereto by means of lines 22, 24 and 25 provided with suitable expansion valves or the like and connected with a common liquid ammonia line 26, which, in turn, is part of the cyclic system including return line 23 and suitable compressing and cooling means as indicated by 28 and 33. The slack wax-solvent mixture is thus cooled to a temperature of 50° F. (which temperature is determined by an independent experiment as described hereinafter to be suitable for precipitating substantially only and yet substantially all of the normal paraffin waxes from the given mixture). Just ahead of the last of the three stages of the chilling operation as represented by chillers 19, 20 and 21, that is, just ahead of chiller 21, another 1.5 parts of solvent mixture (which is made up of filtrate and washings from a subsequent second stage precipitation and filtration operation) is added by means of a line 27 to the partially chilled slack wax-solvent mixture. The resulting slurry of solidified n-paraffin wax suspended in the liquid phase of solvent-oil-liquefied isomeric paraffin is transferred through line 29 to a surge tank 30 (which may be provided with any suitable agitating and cooling means), from which the slurry is transferred to a suitable phase-separating means such as a rotary filter 31. The slurry is filtered at a temperature of 50° F. with the filter cake being washed with another 1.5 parts of solvent mixture delivered to the filter through a line 32. The mixed filtrate and wash solvent, amounting to 4.5 parts (per part of charged slack wax) are collected in a tank 34 for further subsequent processing.

The wax cake from filter 31, containing a small proportion of retained solvent and oil, is transferred by suitable means to a slurry mixing and surge tank 35, provided with suitable agitating and cooling means, wherein it is re-slurried with 1.5 parts of solvent mixture from line 33, cooled to 50° F. by suitable cooler 3. This slurry at 50° F. is then transferred to a filter 27 wherein it is filtered and washed, the filtrate being collected in a vessel 38 and the wash liquid being collected in a vessel 39. The recovered wash liquid is transferred through line 32 to filter 31 for use therein as already discussed. The wax cake is transferred from filter 37 by suitable means, indicated by line 40, to suitable product wax storage 41 for the normal paraffin wax, the recovery being about 65% (based on total charge stock) for the particular slack wax cut chosen. The n-paraffin wax had a melting point of about 140° F. Any solvent remaining therein may be recovered by any suitable means, as will be understood in the art, and returned to solvent storage 42 by means of lines 44 and 45.

Now, returning to the filtrate and washing mixture from filter 31, which mixture contains the isometric iso- and cyclo-paraffin waxes and the oil contents of the slack wax charge in solution-admixture with 4.5 parts of solvent, this mixture is transferred by line 51 to a series of double pipe heat exchangers 52, 54 and 55 wherein the mixture is cooled serially and finally to a suitable temperature for precipitating the isomeric paraffin waxes, or to a temperature which is selected to yield a dewaxed oil fraction having a desired pour point, in the present case to a temperature of $-15°$ F. The chilling in the first two of the heat exchangers (52 and 54) is effected by heat exchange against the chilled filtrate from filtration at $-15°$ F. of a preceding portion of the same mixture while the last stage of the chilling is effected by ammonia refrigeration using liquefied ammonia taken from line 56, with suitable expansion through any suitable expansion means such as an expansion valve (not shown). The thus chilled mixture, which is now a slurry of isomeric iso- and cycloparaffin waxes (microcrystalline or amorphous), is transferred through line 57 to a surge tank 59, which may be provided with suitable agitating and cooling means as 60 and 61, respectively, maintained at $-15°$ F. The slurry is transferred from surge tank 59 by means of a line 62 to a suitable solid-liquid phase-separating means such as a rotary filter 64, wherein the slurry is filtered at $-15°$ F. to yield a filtrate which is delivered to a storage vessel 65. Three and one-half parts of this filtrate is delivered through lines 66 and 67 to the heat exchangers 52 and 54 and thence to a dewaxed oil storage 69, from which the solvent is removed by any suitable means and returned by lines 70 and 45 to solvent storage 42. The dewaxed oil recovery for the particular case used amounted to about 10%, based on slack wax charge.

The filter cake of isomeric paraffin waxes in filter 64 is washed with 0.5 part of fresh, chilled solvent mixture taken from storage 42 and chilled to $-15°$ F. in a suitable cooler 71, the washings being transferred to storage tank 72. The washings from this operation, together with one part of filtrate from filtrate storage 65 are delivered through lines 74, 66 and 16 to a line 14 for admixture with a subsequent portion of slack wax charge. The washed filter cake is removed from filter 64 to a soft wax storage 75, via line 76, the small proportion of solvent therein being recovered by any suitable means and returned to solvent storage 42 through lines 77 and 45. The soft wax recovery, that is, the mixture of microcrystalline or amorphous isomeric paraffin waxes, for this case amounted to about 25%, based on the slack wax charge.

It will be understood that various modifications of the above-described process will be made in processing different wax mixtures in accordance with the present invention. Thus, for the different narrow boiling range cuts of the above-described wide boiling range slack wax material, the first temperature of separation of normal- from isomeric-paraffin waxes will vary depending on the particular cut being processed. The first separation temperature will be higher the higher the boiling point range of the wax fraction. On the other hand, the second separation temperature, i. e., the temperature at which the isomeric paraffin waxes are precipitated from solution, may be the same for the various fractions, such as $-10°$ F. down to $-40°$ F. In fact, if it is desired, the filtrates from the first-temperature separations may be combined and treated together to effect the second-temperature separation. It will be understood further, of course, that various blend combinations of the separated waxes may be made to yield wax blends with desired characteristics. As already indicated, various diluents and/or selective solvents may be used in place of the methyl ethyl ketone-benzene solvent used in the foregoing illustrative example, or the separation may be effected without any added solvent in some cases. Further, in the case of an oil-containing wax, such as slack wax, the narrow cut oil wax-charge may first be subjected to a very low temperature, such as the $-15°$ F. of the foregoing illustration, or even to lower temperatures such as $-40°$ F., more or less, alone or, preferably, in the presence of a suitable diluent and/or selective solvent, whereby the normal as well as the isomeric paraffin waxes precipitate out and are separated from the oil and the separated oil-free mixture of waxes is then subjected to a temperature at which the isomeric iso- and cyclo-paraffin waxes are liquefied (dependent on the absence or presence of added solvent and the nature of any added solvent and usually in the order of five to about twenty-five degrees Fahrenheit below the melting point of the lowest melting normal paraffin wax present therein), and the solidified normal wax then separated from the isomeric paraffin waxes in solution in the solvent and/or in the liquefied state.

The present invention is applicable to the treatment of various types of paraffinic wax mixtures, including slack waxes (as described above), slop waxes, scale waxes, short and long wax residues as obtained by processes well known to the art, etc. The fractionation of the wax mixture into the required fractions to be processed in accordance with the invention may be made by any suitable method, such as by distillation, preferably under reduced pressure, and with or without an added extraneous carrying agent. In the fractionation, sufficiently narrow range of molecular weights and of the corresponding boiling points in a cut may be tested empirically by a small-scale test on an aliquot part of the "cut," in solution with a suitable solvent, to determine that when the resulting solution is cooled appreciably below the melting point of the lowest-melting n-paraffin wax therein, there is substantially complete separation of the n-paraffin wax therein from the non-straight chain waxes in the cut. Tests upon the resulting separated wax to show the structural character of the wax are readily made by persons skilled in the art making use of such conventional tests as that for ring value and for asymmetric value.

In addition to advantages already referred to which accrue from the practice of the invention, other advantages will be apparent to those skilled in the art from the foregoing description of the invention. For example, as indicated in the process described with reference to the accompanying drawing, an important advantage derived from the fact that relatively much smaller proportions of solvents may be used than are normally required in the processes as generally used in the art. Thus, as indicated in the illustrative example, as little as four parts of solvent may be used per part of slack wax. Of course, it will be understood that the ratio of solvent to waxy material may be varied over relatively wide ranges for the various operations, and depending on the nature of the solvent, the proportions of the different types of waxes in the waxy material being treated, etc. In general, for a given separating step, for example, the step of separating the normal paraffin waxes from the iso- and/or cyclo-paraffin waxes, the ratio of solvent to waxy material may range from substantially zero up to 3 to 5, or even up to 10 to 15 if the economics of the operation permit. With the smaller volumes of solvent the refrigeration requirements are greatly reduced. Another advantage lies in the fact that no great demand is made upon the selectivity of the solvent, although, as stated hereinabove, solvents with greater selectivity for the waxes produce a greater spread between the solidification temperature of the lowest melting normal paraffinic wax and of the highest melting isomeric paraffinic wax present in a given narrow range cut of waxes in the presence of said solvent.

Various modifications of the hereinabove-described techniques of manipulation as are known in the art may be utilized in the practice of the invention. Thus, the separation of solid from liquid phases may be effected by pressure filtration, vacuum filtration, centrifugation, etc. The cooling operations effecting wax crystallization may be stepwise, if desired, and also with or without "shock" chilling with stepwise introduction of super-cooled diluent and/or selective solvent so as to effect a control over the crystal formation.

This application is a continuation-in-part of copending applications Serial No. 744,603, filed April 29, 1947, and Serial No. 772,638, filed September 8, 1947, both now abandoned.

I claim as my invention:

1. A process for the separation of straight-chain paraffin waxes from paraffinic waxy mixtures containing both straight-chain paraffin waxes and non-straight-chain paraffin waxes in the range of $C_{20}$ to $C_{35}$ hydrocarbons and wherein there is an overlapping of the melting points of the two types of waxes present, which process comprises the steps of: separating from said waxy mixture a plurality of narrow boiling range distillate fractions at least one of which contains both straight-chain and non-straight-chain paraffin waxes, has a boiling point range of not more than 40° C., and contains as straight-chain paraffin waxes only hydrocarbon waxes which differ by only four carbon atoms per molecule ($C_n$ to $C_{n+4}$), wherein $n$ is an integer of from about 20 to about 35, and as non-straight-chain paraffin waxes only isomers of said straight-chain paraffin waxes, whereby the melting point of the lowest molecular weight ($C_n$) straight-chain paraffin wax present is higher than the melting point of the highest melting ($C_{n+4}$) non-straight-chain paraffin wax present therein; adjusting and maintaining the temperature of said distillate fraction at a temperature below the melting point of the $C_n$-straight-chain paraffin wax present and at which substantially all of the straight-chain paraffin waxes present is in the solid state but above the temperature at which any appreciable amount of the non-straight-chain paraffin waxes separates as solid material, thereby producing a solid phase of substantially all of the straight-chain paraffin waxes present in said fraction and substantially free from non-straight-chain paraffin waxes; and separating said solid straight-chain paraffin waxes from the liquid phase of said non-straight-chain paraffin waxes.

2. A process for the separation of straight-chain paraffin waxes from a paraffinic waxy mixture of straight-chain paraffin waxes and non-straight-chain paraffin waxes at least some of which straight-chain paraffin waxes have melting points below the melting points of at least some of said non-straight-chain paraffin waxes present therein, which process comprises: separating from said waxy mixture by distillation a plurality of distillate fractions each of which has a boiling point range of not more than about 40° C., contains both straight-chain paraffin waxes and non-straight-chain paraffin waxes, and the number of carbon atoms per molecule of all of the paraffin waxes present therein differs by no more than four carbon atoms, whereby the melting point of the lowest melting straight-chain paraffin wax present in a given one of said fractions is higher than the melting point of the highest melting non-straight-chain paraffin wax present in the same fraction; intimately and separately mixing each of said fractions with a non-viscous diluent which is non-reactive with said waxes and adjusting the temperatures of the resulting mixtures thereof to temperatures, respectivley, which are below the melting points of the lowest melting straight-chain paraffin waxes in the respective fractions and at which the straight-chain paraffin waxes present therein are substantially insoluble but substantially all of the other paraffin waxes present therein exist as a liquid phase with said diluent, thereby producing precipitates from each of said fractions of substantially all of the straight-chain paraffin waxes present therein, respectively, as substantially pure straight-chain paraffin waxes and liquid phases of all of the other paraffin waxes with the diluent; and separating the precipitates from the respective liquid phases.

3. A process for the separation of straight-chain paraffin waxes from paraffinic waxy mixtures containing both straight-chain paraffin waxes and non-straight-chain paraffin waxes in the range of $C_{20}$ to $C_{35}$ hydrocarbons and wherein there is an overlapping of the melting points of the two types of waxes present, which process comprises the steps of: separating from said waxy mixture a plurality of narrow boiling range distillate fractions at least one of which contains both straight-chain and non-straight-chain paraffin waxes, has a boiling point range of less than 23° C. at 15 mm. of mercury pressure, and contains as straight-chain paraffin waxes only hydrocarbon waxes which differ by only two carbon atoms per molecule ($C_n$ to $C_{n+2}$), wherein $n$ is an integer of from about 20 to about 35, and as non-straight-chain paraffin waxes only isomers of said straight-chain paraffin waxes, whereby the melting point of the lowest molecular weight ($C_n$) straight-chain paraffin wax present is higher than the melting point of the highest melting non-straight-chain paraffin wax present therein; adjusting and maintaining the temperature of said distillate fraction at a temperature below the melting point of the $C_n$ straight-chain paraffin wax present and at which substantially all of the straight-chain paraffin waxes present are in the solid state but above the temperature at which any appreciable amount of the non-straight-chain paraffin waxes separates as solid material, thereby producing a solid phase of substantially all of the straight-chain paraffin waxes present in said fraction and substantially free from non-straight-chain paraffin waxes; and separating said solid straight-chain paraffin waxes from the liquid phase of said non-straight-chain paraffin waxes.

4. A process for the separation of straight-chain paraffin waxes from non-straight-chain paraffin waxes in an oily slack wax stock having a boiling range of from about 180° F. to about 310° F. at 7 mm. of Hg pressure and containing paraffinic waxes ranging from about $C_{20}$ to about $C_{35}$, which process comprises subjecting said slack wax to fractional distillation under reduced pressure to produce at least one fraction therefrom having a boiling point range of not more than about 40° C. and containing only hydrocarbon oil and both straight-chain hydrocarbon waxes and non-straight-chain hydrocarbon waxes, the number of carbon atoms per molecule of all of which waxes are present differs by no more than four carbon atoms; intimately mixing said fraction with a non-viscous diluent which is non-reactive with said waxes and adjusting the temperature of the mixture to a temperature below the melting point of the lowest melting straight-chain paraffin wax present and at which substantially all of the straight-chain paraffin waxes present therein are insoluble but substantially all of the non-straight-chain paraffin waxes present therein exist as a liquid phase with said diluent and the oil, thereby producing a precipitate of substantially all of the straight-chain paraffin waxes present therein as a single fraction of straight-chain paraffin waxes and a liquid phase of substantially all of the non-straight-chain paraffin waxes with the diluent and oil; separating the precipitate from the liquid phase; chilling the separated liquid phase to a still lower temperature sufficiently low to precipitate a substantial proportion of the non-straight-chain paraffin waxes present therein without precipitating any of the hydrocarbon oil present; and separating the precipitate of non-straight-chain paraffin waxes from the remaining solution of diluent and oil.

5. A process for the separation of straight-chain paraffin waxes from paraffinic waxy mixtures containing both straight-chain paraffin waxes and non-straight-chain paraffin waxes and wherein there is an overlapping of the melting points of the two types of waxes present, which process comprises the steps of: separating from said waxy mixture a plurality of narrow boiling range distillate fractions having boiling ranges which are not greater than about 34° C. at 15 mm. of mercury pressure and each of which contains both straight-chain and non-straight-chain paraffin waxes, each of which contains as straight-chain paraffin waxes substantially only hydrocarbon waxes which differ by no more than three carbon atoms per molecule ($C_n$ to $C_{n+3}$, wherein $n$ is an integer of at least about 20), and as normally solid non-straight-chain paraffin waxes only isomers of said straight-chain paraffin waxes, whereby the melting point of the lowest molecular weight ($C_n$) straight-chain paraffin wax present in a given fraction is higher than the melting point of the highest melting non-straight-chain paraffin wax present in the same fraction; intimately and separately mixing said straight-chain paraffin waxes and said normally solid non-straight-chain paraffin waxes in each of said fractions, respectively, with a non-viscous diluent which is non-reactive with said waves; separately adjusting the temperatures of the respective resulting mixtures to temperatures, respectively, at which all of the normal paraffin hydrocarbons present are substantially insoluble but above the highest temperature at which any appreciable amount of isomeric paraffins present therein separates as solid material, said temperatures being, respectively, those at which an equilibrium increment of wax separated therefrom has the lowest index of refraction of any equilibrium increment of wax which is separable from the particular mixture at any other temperature, thereby producing separate precipitates of substantially all of the straight-chain paraffin waxes present in the respective fractions substantially free from isomeric hydrocarbons and solutions in the diluent of the isomeric hydrocarbons; and separating the precipitates of straight-chain paraffin waxes from the respective solutions of diluent and isomeric hydrocarbons.

6. A process in accordance with claim 5 wherein the distillate fractions have boiling ranges no greater than about 23° C. at 15 mm. of mercury pressure.

7. A process for the separation of straight-chain paraffin waxes from paraffinic waxy mixtures containing both straight-chain paraffin waxes and non-straight-chain paraffin waxes in the range of $C_{20}$ to $C_{60}$-hydrocarbons and wherein there is an overlapping of the melting points of the two types of waxes present, which process comprises the steps of: separating from said waxy mixture a plurality of narrow boiling range distillate fractions each of which has a boiling range which is not greater than about 45° C. at 15 mm. of mercury pressure and at least one of which contains both straight-chain and non-straight-chain paraffin waxes, has a boiling range of less than 34° C. at 15 mm. of mercury pressure, and contains as straight-chain paraffin waxes substantially only hydrocarbon waxes which differ by no more than three carbon atoms per molecule ($C_n$ to $C_{n+3}$, where $n$ is an integer of from about 20 to 60), and as normally solid non-straight-chain paraffin waxes only isomers of said straight-chain paraffin waxes, whereby the melting point of the lowest molecular weight ($C_n$) straight-chain paraffin wax present is higher than the melting point of the highest melting non-straight-chain paraffin wax present therein; intimately mixing said normal paraffin hydrocarbon waxes and said normally solid non-straight-chain paraffin waxes in said 34° C.-boiling-range-fraction with a non-viscous diluent which is non-reactive with said waxes; adjusting the temperature of the resulting mixture to a temperature at which all of the normal paraffin hydrocarbons present are substantially insoluble but above the highest temperature at which any appreciable amount of isomeric paraffins present therein separates as solid material, said temperature being that at which an equilibrium increment of wax separated therefrom has the lowest index of refraction of any equilibrium increment of wax which is separable from said mixture at any other temperature, thereby producing a precipitate of substantially all of the n-paraffin waxes present in said fraction substantially free from isomeric hydrocarbons and a solution in said diluent of isomeric paraffin hydrocarbons; and separating the precipitate of normal paraffin waxes from the solution of diluent and isomeric hydrocarbons.

8. A process for the separation of paraffin waxes from a paraffinic waxy mixture which contains both straight-chain paraffin waxes and non-straight-chain paraffin wax isomers thereof having a boiling range at least substantially co-extensive with the boiling range of said straight-chain paraffin waxes, said waxy mixture also containing a substantial proportion of high-boiling hydrocarbon oil, which process comprises: separating from said waxy mixture by distillation a plurality of distillate fractions each of at least two of which has a boiling point range of not more than about 40° C., contains both straight-chain paraffin waxes and non-straight-chain paraffin waxes and hydrocarbon oil and the number of carbon atoms per molecule of the paraffin waxes present therein differs by no more than four carbon atoms, whereby the melting point of the lowest melting straight-chain paraffin wax present in a given one of said fractions is higher than the melting point of the highest melting non-straight-chain paraffin wax present in the same fraction, said fractions being selected so that the lower boiling fraction of the two contains straight-chain paraffin wax having a melting point lower than the melting point of at least a portion of the non-straight-chain paraffin wax present in the other fraction; intimately and separately mixing each of said two fractions with a non-viscous diluent which is non-reactive with said waxes and separately adjusting the temperatures of the resulting mixtures thereof to temperatures, respectively, which are below the melting points of the lowest melting straight-chain paraffin waxes in the respective fractions and at which the straight-chain paraffin waxes present therein are substantially insoluble but substantially all of the other paraffin waxes present therein exist as a liquid phase with the oil and said diluent, thereby producing precipitates from each of said two fractions of substantially all of the straight-chain paraffin waxes present therein, respectively, and liquid phases of the other paraffin waxes and the hydrocarbon oil with the diluent; separating the precipitates from the respective liquid phases; combining at least substantial portions of the two separated liquid phases; cooling the resulting mixture of liquid phases to a temperature at which a substantial proportion of the non-straight-chain paraffin waxes present therein precipitate, including waxes from both of the liquid phases which were combined, thereby producing a second precipitate consisting essentially of non-straight-chain paraffin waxes, and separating said second precipitate of non-straight-chain paraffin waxes from the remaining liquid phase.

9. In a process for dewaxing a waxy mineral oil which contains both n-paraffin hydrocarbon waxes and isomers thereof extending over the range of $C_{20}$ to $C_{35}$-hydrocarbons, which isomers have a boiling range at least substantially co-extensive with the boiling range of said n-paraffin hydrocarbon waxes, the improvement which comprises the steps of: separating from said waxy mineral oil a plurality of narrow boiling range distillate fractions at least one of which has a boiling range which is not greater than about 45° C. at 15 mm. of mercury pressure and contains as normal paraffin waxes only $C_n$ to $C_{n+4}$-normal paraffin hydrocarbons, wherein $n$ is an integer from about 20 to about 35, and as other paraffin hydrocarbons only isomers thereof, and the melting point of the $C_n$-normal paraffin hydrocarbon present is higher than the melting point of the highest melting isomeric hydrocarbon present; intimately mixing said fraction with a solvent proportion of a polar solvent for paraffin hydrocarbons; adjusting the temperature of the resulting mixture to a temperature below the melting point of the $C_n$-normal paraffin hydrocarbon present and at which the n-paraffins therein are substantially insoluble but above the temperature at which any appreciable amount of isomeric paraffins therein separates as solid material, said temperature being that at which an equilibrium increment of wax separated thereat has the lowest index of refraction of any equilibrium increment separable therefrom at any other temperature, thereby producing a precipitate of substantially all of the n-paraffin waxes present in said fraction substantially free from isomeric hydrocarbons and a solution in said solvent of the remaining portion of said fraction; and separating the precipitate of n-paraffin waxes from the solution of solvent and isomeric hydrocarbons.

10. In a process for dewaxing a waxy mineral oil which contains both normal paraffin hydrocarbon waxes and isomers thereof extending over the range of $C_{20}$ to $C_{35}$-hydrocarbons, which isomers have a boiling range at least substantially co-extensive with the boiling range of said normal paraffin hydrocarbon waxes, the improvement which comprises separating from said waxy mineral oil a plurality of narrow boiling range distillate fractions each of which has a boiling range which is not greater than about 45° C. at 15 mm. of mercury pressure and each of which fractions contains as normal paraffin hydrocarbons only those which differ by no more than four carbon atoms per molecule, and as other paraffins only isomers thereof; intimately mixing each of said fractions separately with a solvent proportion of a solvent for said fraction of paraffin hydrocarbons; separately adjusting the temperature of each of said resulting solvent-oil mixtures to a temperature below the melting point of the lowest melting normal paraffin hydrocarbon present therein and at which said lowest melting normal paraffin hydrocarbon is substantially insoluble in the solvent present but above the temperature at which any appreciable amount of isomeric paraffins therein separates as solid material, said temperature being that at which an equilibrium increment of wax separated thereat has the lowest index of refraction of any equilibrium increment separable therefrom at any other temperature, thereby producing precipitates of substantially all of the normal paraffin waxes in the respective fractions and solutions in said solvent of the remaining portions of said fractions; and separating the precipitates of normal paraffin waxes from the respective solvent solutions of isomeric hydrocarbons.

11. In a process for dewaxing a waxy mineral oil which contains both normal paraffin hydrocarbon waxes and isomers thereof extending over the range of $C_{20}$ to $C_{35}$-hydrocarbons, which isomers have a boiling range at least substantially co-extensive with the boiling range of said normal paraffin hydrocarbon waxes, the improvement which comprises the steps of: separating from said waxy mineral oil a plurality of narrow boiling range distillate fractions at least one of which has a boiling range which is not greater than about 45° C. at 15 mm. of mercury pressure and selected so that it contains the $C_{26}$-normal paraffin hydrocarbon, whereby said fraction contains as normal paraffin hydrocarbons substantially only $C_n$ to $C_{n+4}$-normal paraffin hydrocarbon, wherein $n$ is an integer of from about 20 to about 35, including the $C_{26}$-normal paraffin, and as other paraffins only isomers thereof, and the melting point of the $C_n$-normal paraffin hydrocarbon present is higher than the melting point of the highest melting isomeric hydrocarbon present; intimately mixing said fraction with a solvent proportion of a polar solvent for said fraction of hydrocarbons; adjusting the temperature of the resulting mixture to a temperature at below the melting point of the $C_n$-normal paraffin hydrocarbon present and at which the n-paraffins present therein are substantially insoluble but above the temperature at which any appreciable amount of isomeric paraffins present therein separates as solid material, said temperature being that at which an equilibrium increment of wax separated thereat has the lowest index of refraction of any equilibrium increment separable therefrom at any other temperature, thereby producing a precipitate of substantially all of the n-paraffin waxes present in said fraction substantially free from isomeric hydrocarbons and a solution in said solvent of the remaining portion of said fraction; and separating the precipitate of normal paraffin waxes from the solution of solvent and isomeric hydrocarbons.

12. In a process for dewaxing a waxy mineral oil which contains both normal paraffin hydrocarbon waxes and isomers thereof in the range of $C_{20}$ to $C_{35}$-hydrocarbons, which isomers have a boiling range at least substantially co-extensive with the boiling range of said n-paraffin hydrocarbon waxes, the improvement which comprises the steps of: separating from said waxy mineral oil by distillation a plurality of distillate fractions at least one of which has a boiling range of about 28° C. at 15 mm. of mercury pressure, whereby said fraction contains as normal paraffin waxes substantially only $C_n$ to $C_{n+3}$-normal paraffin hydrocarbons wherein $n$ is an integer from about 20 to about 35, and as non-straight-chain paraffins substantially only isomers thereof and the melting point of the $C_n$-normal paraffin hydrocarbon is higher than the melting point of the highest melting isomeric hydrocarbon present; intimately mixing said fraction with a polar solvent for paraffin hydrocarbons; adjusting the temperature of the resulting mixture to a temperature below the melting point of the $C_n$-normal paraffin hydrocarbon present and at which the n-paraffins therein are substantially insoluble but above the temperature at which any appreciable amount of isomeric paraffins therein separates as solid material, thereby producing a precipitate of substantially all of the normal paraffin waxes present in the given fraction and a solution in said solvent of the remaining portion of said given oil fraction; and separating the precipitate of n-paraffin waxes from the solution of solvent and isomeric hydrocarbons.

13. In a process for dewaxing a waxy mineral oil which contains both normal paraffin hydrocarbon waxes and isomers thereof extending over the range of $C_{20}$ to $C_{35}$-hydrocarbons, which isomers have a boiling range at least substantially co-extensive with the boiling range of said normal paraffin hydrocarbon waxes, the improvement which comprises the steps of: separating from said waxy mineral oil a plurality of narrow boiling range distillate fractions each of which has a boiling range which is not greater than about 45° C. at 15 mm. of mercury pressure and at least one of which has a boiling range which is about 20° C. at 15 mm. of mercury pressure and contains as normal paraffin waxes substantially only $C_n$ to $C_{n+2}$-normal paraffin hydrocarbons, wherein $n$ is an integer from about 20 to about 35, and as normally solid non-straight-chain paraffins substantially only isomers of said normal paraffin hydrocarbons, and the melting point of the $C_n$-normal paraffin hydrocarbon present is higher than the melting point of the highest melting isomeric hydrocarbon present; dissolving the normal paraffin hydrocarbon waxes and the normally solid non-straight-chain paraffin hydrocarbons present in said 20° C.-boiling-range-fraction in a solvent proportion of a polar solvent therefor; cooling the resulting solution to a temperature at which all of the normal paraffin hydrocarbons present are substantially insoluble but above the highest temperature at which any appreciable amount of isomeric paraffins therein separates as solid material, said temperature being that at which an equilibrium increment of wax separated thereat has the lowest index of refraction of any equilibrium increment of wax which is separable from said solution at any other temperature, thereby producing a precipitate of substantially all of the n-paraffin waxes present in said fraction substantially free from isomeric hydrocarbons and a solution in said solvent of isomeric paraffin hydrocarbons; and separating the precipitate of normal paraffin waxes from the solution of solvent and isomeric hydrocarbons.

14. In a process for dewaxing a waxy mineral oil which contains both normal paraffin hydrocarbon waxes and isomers thereof extending over the range of $C_{20}$ to $C_{35}$-hydrocarbons, which isomers have a boiling range at least substantially co-extensive with the boiling range of said normal paraffin hydrocarbon waxes, the improvement which comprises the steps of: separating from said waxy mineral oil a plurality of narrow boiling range distillate fractions each of which has a boiling range which is not greater than about 45° C. at 15 mm. of mercury pressure and at least one of which has a boiling range which is about 20° C. at 15 mm. of mercury pressure and contains as normal paraffin waxes substantially only $C_n$ to $C_{n+2}$-normal paraffin hydrocarbons, wherein $n$ is an integer from about 20 to about 35, and as non-straight-chain paraffins substantially only isomers of said normal paraffin hydrocarbons, and the melting point of the $C_n$-normal paraffin hydrocarbon present is higher than the melting point of the highest melting isomeric hydrocarbon present; intimately mixing said fraction with a solvent proportion of a polar solvent for said fraction of paraffin hydrocarbons; adjusting the temperature of the resulting mixture to a temperature below the melting point of the $C_n$-normal paraffin hydrocarbon present and at which the normal paraffins therein are substantially insoluble but above the temperature at which any appreciable amount of isomeric paraffins therein separates as solid material, thereby producing a precipitate of substantially all of the normal paraffin waxes present in said fraction substantially free from isomeric hydrocarbons and a solution in said solvent of the remaining portion of said fraction; and separating the precipitate of normal paraffin waxes from the solution of solvent and isomeric hydrocarbons.

15. In a process for dewaxing a waxy mineral oil which contains both normal paraffin hydrocarbon waxes and isomers thereof extending over the range of $C_{20}$ to $C_{35}$-hydrocarbons, which isomers have a boiling range at least substantially co-extensive with the boiling range of said normal paraffin hydrocarbon waxes, the improvement which comprises the steps of: separating from said waxy mineral oil a plurality of narrow boiling range distillate fractions each of which has a boiling range which is not greater than about 45° C. at 15 mm. of mercury pressure and at least one of which has a boiling point range which is about 20° C. at 15 mm. of mercury pressure and contains as normal paraffin waxes substantially only $C_n$ to $C_{n+2}$-normal paraffin hydrocarbons, wherein $n$ is an integer from about 20 to about 35, and as normally solid non-straight-chain paraffins substantially only isomers of said normal paraffin hydrocarbons, and the melting point of the $C_n$-normal paraffin hydrocarbon present is higher than the melting point of the highest melting isomeric hydrocarbon present; intimately mixing said fraction with a solvent proportion of a polar solvent for said fraction of paraffin hydrocarbons; adjusting the temperature of the resulting mixture to a temperature at which all of the normal paraffin hydrocarbons present and at least a substantial proportion of the iso-paraffinic hydrocarbons present which are normally solid at about 25° C. are separated as a solid phase mixture of waxes; separating the resulting solid wax mixture from the solvent-oil solution; intimately mixing the separated solid wax mixture with a solvent proportion of a polar solvent therefor; adjusting the temperature of the resulting mixture to a temperature below the melting point of the $C_n$-normal paraffin hydrocarbon present and at which the normal paraffins therein are substantially insoluble but above the temperature at which any appreciable amount of iso-paraffins therein separates as solid material, thereby producing a precipitate of substantially all of the normal paraffin waxes present in said fraction substantially free from isomeric hydrocarbons and a solution in said solvent of the normally solid iso-paraffinic hydrocarbons in said solid wax mixture; and separating the precipitate of normal paraffin waxes from the solution of solvent and iso-paraffinic hydrocarbons.

16. In a process for dewaxing a waxy mineral oil which contains both normal paraffin hydrocarbon waxes and isomers thereof extending over the range of $C_{20}$ to $C_{35}$-hydrocarbons, which isomers have a boiling range at least substantially co-extensive with the boiling range of said normal paraffin hydrocarbon waxes, the improvement which comprises the steps of: separating from said waxy mineral oil a number of narrow boiling range distillate fractions each one of a plurality of which has a boiling range of about 20° C. at 15 mm. of mercury pressure and contains as normal paraffin hydrocarbons substantially only hydrocarbon waxes which differ by only two carbon atoms per molecule and as non-straight-chain paraffin hydrocarbons only isomers of said normal paraffin hydrocarbons, whereby the melting point of the lowest molecular weight normal paraffin present in each of said plurality of fractions is higher than the melting point of the highest melting isomeric hydrocarbon present in the same fraction; intimately mixing each of said plurality of fractions separately with a solvent proportion of a polar solvent for said fraction of paraffin hydrocarbons; separately adjusting the temperature of each of said resulting mixtures to a temperature at least 15° C. below the melting point of the lowest melting normal paraffin hydrocarbon present therein and at which said lowest melting normal paraffin hydrocarbon is substantially insoluble in the solvent present but above the temperature at which any appreciable amount of isomeric paraffins therein separates as solid material, thereby producing precipitate of substantially all of the normal paraffin waxes in the respective fractions and solutions in said solvent of the remaining portions of said fractions; and separating the precipitates of normal paraffin waxes from the respective solvent solutions of isomeric hydrocarbons, each of said separated precipitates of normal paraffin waxes having the properties substantially of a single molecular species.

17. In a process for dewaxing a waxy mineral oil which contains both normal paraffin hydrocarbon waxes and isomers thereof extending over the range of $C_{20}$ to $C_{35}$-hydrocarbons, and aromatic hydrocarbons, which isomers have a boiling range at least substantially co-extensive with the boiling range of said normal paraffin hydrocarbon waxes, the improvement which comprises the steps of: separating from said waxy mineral oil a plurality of narrow boiling range distillate fractions at least one of which has a boiling range which is not greater than about 45° C. at 15 mm. of mercury pressure and selected so that it contains the $C_{26}$-normal paraffin hydrocarbon, whereby said fraction contains only $C_n$ to $C_{n+4}$-normal paraffin hydrocarbons, including the $C_{26}$-normal paraffin, and isomers thereof, and contains no other hydrocarbon waxes, and the melting point of the $C_n$-normal paraffin present is higher than the melting point of the highest melting isomeric hydrocarbon present; dissolving said fraction of hydrocarbons in approximately an equal part by weight of methyl ethyl ketone; cooling the resulting solution to a temperature of about 5° C., thereby producing a precipitate of substantially all of the $C_n$ to $C_{n+4}$-normal paraffin hydrocarbons present in said fraction and substantially free from isomeric hydrocarbons and a solution in the methyl ethyl ketone of the remaining portion of said fraction; and separating the precipitate of normal paraffin waxes from the solution of solvent and isomeric hydrocarbons.

18. The process of claim 17, wherein the separated solution of methyl ethyl ketone and isomeric hydrocarbons resulting from the last step is cooled to a temperature of about −10° to −15° C., thereby producing a residual plastic wax mass of normally solid isomeric paraffin waxes and a solvent solution of the remaining portion of said fraction; and separating the residual plastic wax mass from the solvent solution.

AUGUST A. SCHAERER.

REFERENCES CITED

The following references are of record in the file of this patent:

UNITED STATES PATENTS

| Number | Name | Date |
|---|---|---|
| 1,937,518 | Henderson et al. | Dec. 5, 1933 |
| 2,229,658 | Jenkins | Jan. 28, 1941 |
| 2,229,659 | Carr | Jan. 28, 1941 |
| 2,302,431 | Dons et al. | Nov. 17, 1942 |